US008820574B2

(12) United States Patent
Howell et al.

(10) Patent No.: US 8,820,574 B2
(45) Date of Patent: Sep. 2, 2014

(54) FIRST IN FIRST OUT VENDING SYSTEMS

(75) Inventors: Thomas P. Howell, Suwanee, GA (US); Gerard E. Insolia, Atlanta, GA (US); Michael Alan Masters, Atlanta, GA (US); Ryan Lee West, Newnan, GA (US)

(73) Assignee: The Coca-Cola Company, Atlanta, GA (US)

( * ) Notice: Subject to any disclaimer, the term of this patent is extended or adjusted under 35 U.S.C. 154(b) by 1 day.

(21) Appl. No.: 13/183,489

(22) Filed: Jul. 15, 2011

(65) Prior Publication Data

US 2011/0284569 A1 Nov. 24, 2011

Related U.S. Application Data

(62) Division of application No. 11/610,648, filed on Dec. 14, 2006, now abandoned.

(51) Int. Cl.
*G07F 11/02* (2006.01)
*B65G 59/00* (2006.01)
*G07F 9/02* (2006.01)

(52) U.S. Cl.
CPC .................................... *G07F 9/026* (2013.01)
USPC ..................... 221/104; 221/1; 221/9; 221/17

(58) Field of Classification Search
USPC ........................................................ 221/104
See application file for complete search history.

(56) References Cited

U.S. PATENT DOCUMENTS

| | | | |
|---|---|---|---|
| 1,600,188 | A | 9/1926 | McNeeley |
| 2,570,516 | A | 10/1951 | Bowman |
| 2,719,651 | A | 10/1955 | Gabrielsen |
| 2,877,928 | A | 3/1959 | Patzer et al. |
| 3,128,013 | A | 4/1964 | Holstein et al. |
| 3,263,857 | A | 8/1966 | Mrakauer et al. |
| 3,512,679 | A | 5/1970 | Stoltz |
| 3,613,946 | A | 10/1971 | Klem |
| 4,108,333 | A | 8/1978 | Falk et al. |
| 4,131,213 | A | 12/1978 | Tamura et al. |
| 4,245,755 | A | 1/1981 | Craven et al. |
| 4,303,179 | A | 12/1981 | Spring |
| 4,600,094 | A | 7/1986 | Hayashi et al. |
| 4,717,044 | A | 1/1988 | Suzuki et al. |
| 4,722,058 | A | 1/1988 | Nakayama et al. |
| 4,823,984 | A | 4/1989 | Ficken |
| 5,050,769 | A | 9/1991 | Levasseur |

(Continued)

FOREIGN PATENT DOCUMENTS

| | | |
|---|---|---|
| EP | 0380097 A2 | 8/1990 |
| GB | 503209 | 10/1937 |

(Continued)

OTHER PUBLICATIONS

U.S. Appl. No. 11/610,648, filed Dec. 14, 2006, Howell, et al., Parent of Divisional being filed.

*Primary Examiner* — Gene Crawford
*Assistant Examiner* — Kelvin L Randall, Jr.
(74) *Attorney, Agent, or Firm* — Sutherland Asbill & Brennan LLP

(57) ABSTRACT

A vending machine for dispensing a number of products. The vending machine may include a transparent panel, a number of visible product columns, a number of non-visible product columns, and a product delivery system.

4 Claims, 23 Drawing Sheets

(56) References Cited

U.S. PATENT DOCUMENTS

| | | | | |
|---|---|---|---|---|
| 5,163,356 | A | 11/1992 | Chigira | |
| 5,392,953 | A | 2/1995 | Maldanis et al. | |
| 5,439,134 | A | 8/1995 | Tsuda et al. | |
| 5,671,362 | A * | 9/1997 | Cowe et al. | 705/28 |
| 5,881,911 | A | 3/1999 | Burdette et al. | |
| 6,019,246 | A * | 2/2000 | Yajima et al. | 221/2 |
| 6,098,841 | A | 8/2000 | Katakai | |
| 6,102,162 | A * | 8/2000 | Teicher | 186/39 |
| 6,155,455 | A | 12/2000 | Yajima et al. | |
| 6,199,720 | B1 | 3/2001 | Rudick et al. | |
| 6,206,234 | B1 | 3/2001 | Rawlins | |
| 6,230,930 | B1 | 5/2001 | Sorensen et al. | |
| 6,247,610 | B1 | 6/2001 | Ziesel et al. | |
| 6,415,953 | B1 | 7/2002 | O'Brien et al. | |
| 6,556,889 | B2 | 4/2003 | Rudick et al. | |
| 6,682,289 | B1 | 1/2004 | Credle, Jr. | |
| 7,040,535 | B2 * | 5/2006 | Sato et al. | 235/381 |
| 7,086,560 | B2 * | 8/2006 | Shioya | 221/191 |
| 2003/0034354 | A1 | 2/2003 | Chirnomas | |
| 2004/0026441 | A1 | 2/2004 | Chirnomas | |

FOREIGN PATENT DOCUMENTS

| | | |
|---|---|---|
| JP | 3189898 | 8/1991 |
| JP | 5089342 | 4/1993 |
| JP | 7296240 | 11/1995 |
| JP | 10283548 | 10/1998 |
| JP | 11272936 | 8/1999 |
| JP | 2001160174 | 6/2001 |
| JP | 2002222455 | 8/2002 |
| JP | 2002279502 | 9/2002 |
| JP | 2003006729 | 1/2003 |
| JP | 2003099845 | 4/2003 |

* cited by examiner

FIRST IN FIRST OUT VENDING SYSTEMS

RELATED APPLICATIONS

The present application is a divisional of U.S. Ser. No. 11/610,648, filed on Dec. 14, 2006, now abandoned. U.S. Ser. No. 11/610,648 is incorporated by reference herein in full.

TECHNICAL FIELD

The present application relates generally to vending machines and methods of operating vending machines and more particularly relates to vending machines and methods for providing first in, first out vending of products stored therein.

BACKGROUND OF THE INVENTION

Many vending machines have a solid front door such that the consumers cannot see the products stored within. Such a solid door allows for storing the products in a first in, first out ("FIFO") fashion without concern for aesthetics. Such FIFO rotation ensures that the products therein are dispensed in a timely and efficient manner.

Glass front vending machines, however, allow the consumers to see the products within the vending machine. As such, glass front venders allow the consumers to select the desired product by location. This type of selection, however, can lead to certain stocking locations being vended only after the preferred locations are empty. Such empty vending locations may give consumers the impression that the remaining products are old or stale. This vending pattern also may lead to poor product lifetime as well as increased maintenance time in that the older products either must be manually moved from the less desirable locations or left to be removed when out of date.

There is a desire, therefore, for improved vending machines and/or improved vending methods for providing first in, first out dispensing of the products therein. The vending machines and methods preferably should display the products to be dispensed in a prominent and attractive manner so as to gain the consumer's attention and interest.

SUMMARY OF THE INVENTION

The present application thus describes a vending machine for dispensing a number of products. The vending machine may include a transparent panel, a number of visible product columns, a number of non-visible product columns, and a product delivery system.

The product delivery system delivers one of the products from one of the non-visible columns to one of the visible columns. The vending machine further may include at least one delivery, port such that the product delivery system delivers one of the products from one of the visible columns to the delivery port. The visible columns may include a number of product cells. The products cells may include a number of sensors positioned thereabout. The product delivery system may be activated when one of the sensors indicates that one of the cells is empty. The visible product columns may include heated or refrigerated product columns. The non-visible product columns may include ambient product columns or heated or refrigerated product columns.

The product delivery system may include a product tray. The visible columns may include a product stop at one end thereof. The product stop may include a number of tines. The product tray may include a number of out of phase tines. The vending machine further may include a number of product baskets. The product baskets may include a number of basket tines. The product delivery system may include a pulley system for motion in a number of axes. The product delivery system may include a picking device a C-clamp device, or include a rotating basket.

The present application further describes a vending machine for dispensing a number of products. The vending machine may include a transparent panel, a number of visible product columns, a number of non-visible product columns, and a product delivery system. The product delivery system may include a product tray and a three-dimensional drive system.

The product delivery system delivers one of the products from one of the non-visible columns to one of the visible columns. The vending machine further may include at least one delivery port and the product delivery system delivers one of the products from one of the visible columns to the delivery port. The number of visible columns may include a product stop at one end thereof. The product stop may include a number of tines. The product tray may include a number of out of phase tines. The visible product shelves may include a number of product baskets. The product baskets may include a number of basket tines.

The three-dimensional drive system may include a pulley system. The visible product columns may include heated or refrigerated product columns. The non-visible product columns may include ambient product columns or heated or refrigerated product columns.

The present application further describes a method of dispensing a number of products from a vending machine shelf with a number of product columns. The method may include the steps of selling down a first column of the number of product columns, selling down a number of adjacent columns one by one while leaving one or more remaining product columns stocked in part or in full, restocking the sold down columns, and selling down the first of the one or more remaining column.

The method further may include the step of selling down the rest of the remaining columns one by one until the remaining columns are depleted. The restocking step may include pushing in a number of new products from the front of each of the product columns.

These and other features of the present application will become apparent to one of ordinary skill in the art upon review of the following detailed description when taken in conjunction with the drawings and the several appended claims.

DETAILED DESCRIPTION

The vending machines and methods described herein may be used with a number of products 10 to be dispensed therefrom. The products 10 may include beverage bottles and cans and similar types of containers. The definition of the term "products 10", however, also includes any type of item or container that may be vended as is described in more detail below. As such, the present application is not limited to the nature of the products 10. Any number of the products 10 may be used herein.

Figure 1:
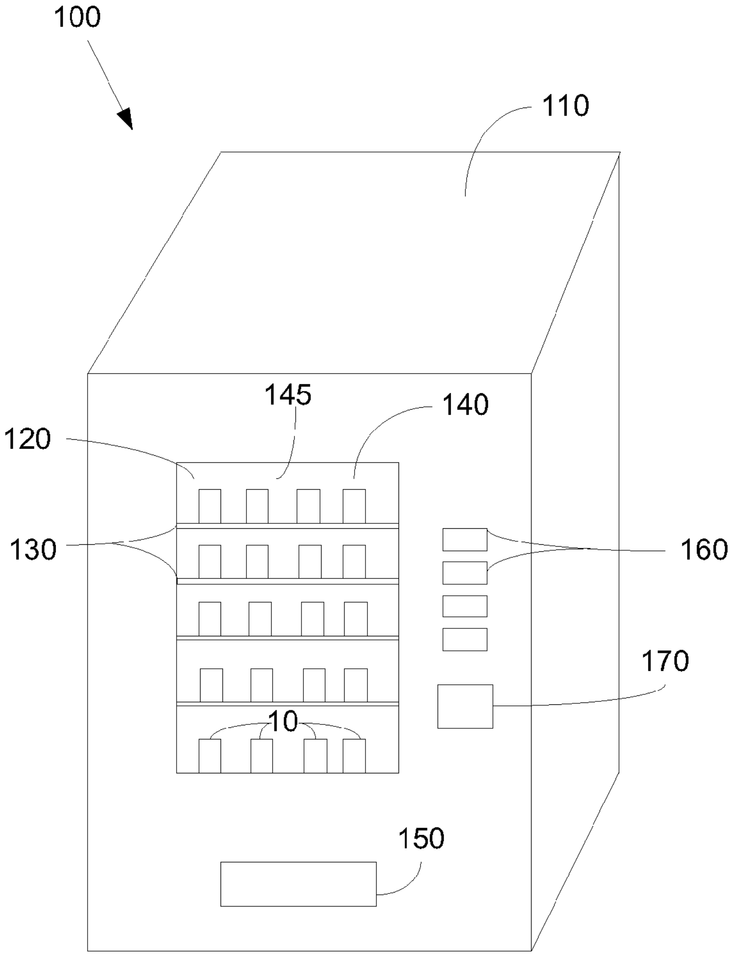
FIG. 1 is a perspective view of a vending machine as is described herein.
Figure 2:
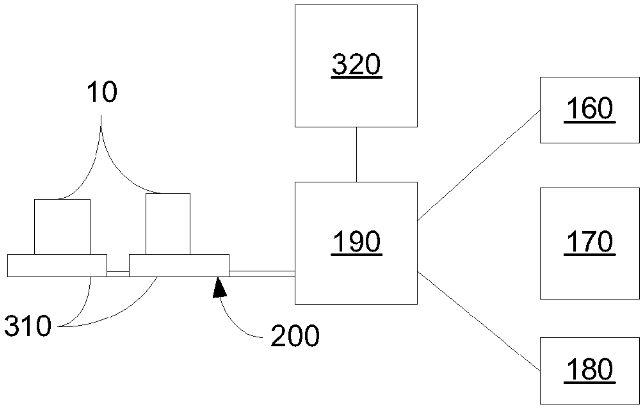
FIG. 2 is a schematic view of the components of the vending machine of FIG. 1.

Referring now to the drawings in which like numerals indicate like elements throughout the several views, FIGS. 1 and 2 show a vending machine 100 as is described herein. The vending machine 100 includes an outer shell 110. The outer shell 110 may be insulated. The outer shell 110 defines an interior vending space 120. The interior vending space 120 may have visible and non-visible portions as will be described in more detail below. The interior vending space 120 may have a number of product shelves 130 positioned therein. The product shelves 130 may be flat or slanted for a gravity load. Any number of product shelves 130 may be used herein. The products 10 may be positioned on the product shelves 130.

In this example, the vending machine 110 may include a front door 140. The front door 140 has at least one transparent panel 145. A consumer can see through the transparent panel 145 and see at least some of the products 10 therein. The vending machine 110 may include a dispensing port 150. The consumer can grasp and remove the product 10 as it enters the dispensing port 150. More than one dispensing port 150 may be used. The vending machine 100 may include a number of selection panels 160. The selection panels 160 may indicate the type of products 10 stored therein and/or the selection panels 160 may indicate a specific location within the vending machine 100 from which a product 10 may be vended. The vending machine 100 may include a payment device 170. The payment device 170 may take cash, credit cards, debit cards, or other methods of payment. The vending machine 100 further may include conventional heating and/or refrigeration devices 180.

Operation of the vending machine 100 may be controlled by a controller 190. The controller 190 may be a conventional programmable microprocessor or the like. The controller 190 may be in communication with other devices, either directly or within a network. Other types of conventional vending machine components may be used herein. Examples of known vending machines 100 with the front door 140 include the "DN500" glass front vender sold by Disie-Narco Vending Systems of Williston, S.C., the "Vision Vender" sold by Royal Vendors, Inc. of Kearneysville, W.V., and the "VUE" vender sold by Sanden Vendo America of Dallas, Tex.

Figure 3:
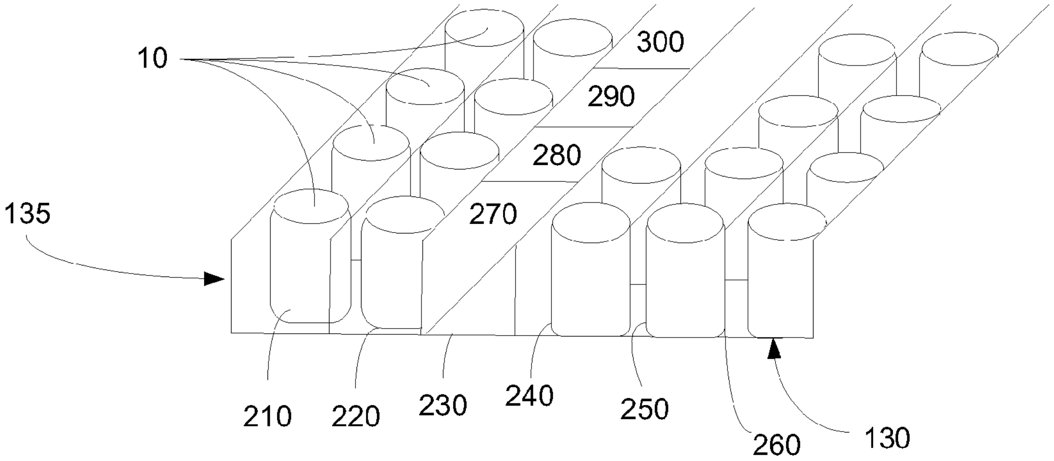
FIG. 3 is a schematic view of one shelf of the vending machine of FIG.
Figure 4A:
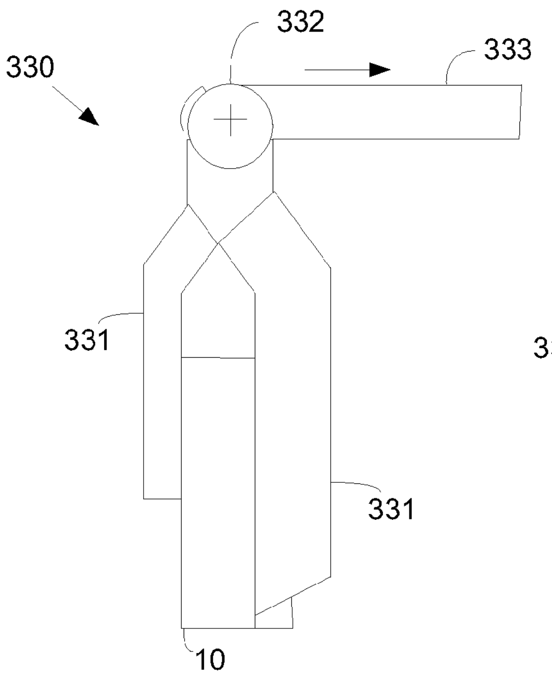
FIGS. 4A-4D are side views of a picking device for use in the vending machine of FIG. 1.
Figure 4B:
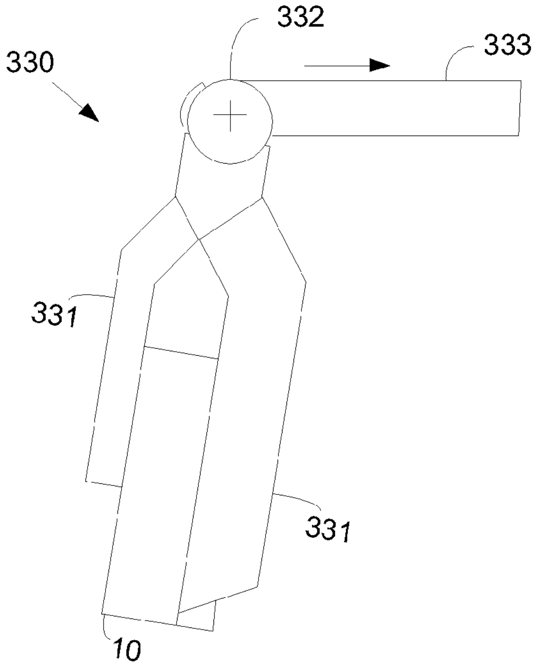
Figure 4C:
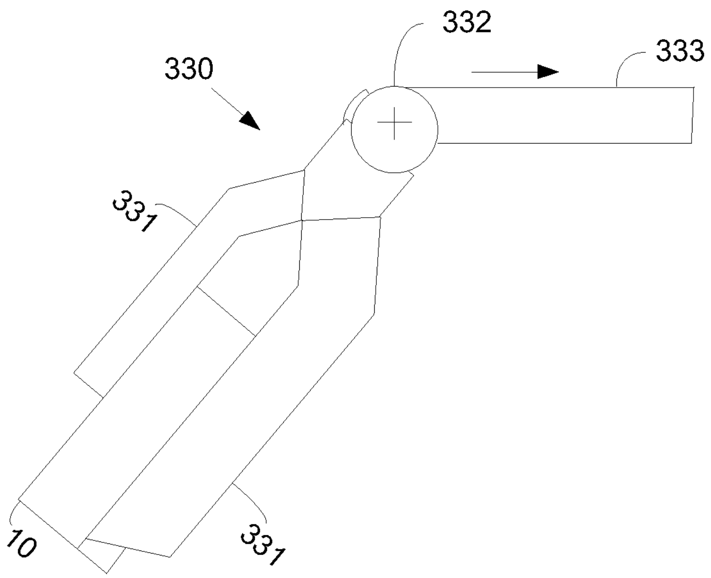
Figure 4D:
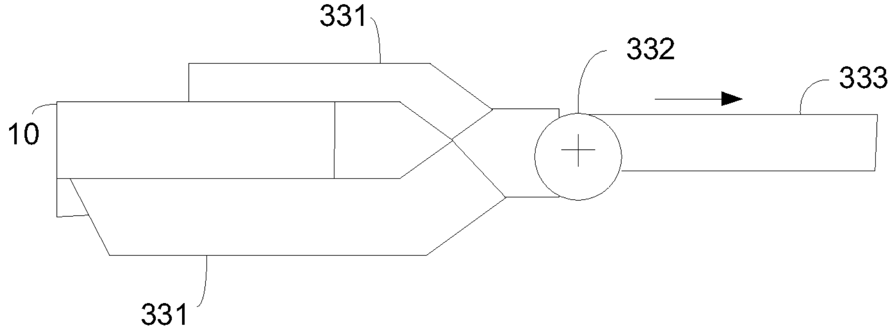

The vending machine 100 also may include a product rotation system 200. As is shown by way of example in FIG. 3, each product shelf 130 may have a number of product columns 135, with some of the product columns 135 being visible to the consumer and some not being visible. Specifically, each product shelf 130 may have a first visible column 210, a second visible column 220, a third visible column 330, and a fourth visible column 240 as well as a first non-visible column 250 and a second non-visible column 260. Any number of visible and non-visible columns may be used herein. By the term "non-visible", we mean that the view of the columns is not readily apparent from a distance. Even the non-visible columns, however, can be seen when looking through the front door 140 at close range.

The visible product columns 210-240 may be heated or refrigerated as desired. The non-visible product columns 250, 260 also may be heated or refrigerated or they may remain at ambient conditions so as to conserve energy and promote a longer shelf life (in the case of products to be heated). The product columns 135 also can be arrange in visible and non-visible positions horizontally as well as the vertical embodiment shown, i.e., entire shelves may be visible or non-visible.

Each of the visible columns 210-240 may include a number of product cells. By way of example, the first visible column 210 may include a first product cell 270, a second product cell 280, a third product cell 290, and a fourth product cell 300. Any number of product cells may be used herein. Each cell 270-300 is simply a location in the product column 210. Each or some of the product cells 270-300 may include a sensor 310. The sensor 310 may be a touch sensor that detects the presence of a product 10 in the particular cell 270-300. The sensor 310 also may be a photoelectric cell, magnetic, or any other type of conventional sensing device. Each sensor 310 may be in communication with the controller 190.

The product rotation system 200 also includes a product delivery system 320. The product delivery system 320 may be any type of device that can move the products 10 from the non-visible cells 250, 260 to the visible cells 210-240. The product delivery system 320 may include a picking or grabbing device as is described in more detail below. The product delivery system 320 also may be any type of electromechanical, magnetic, pneumatic, combinations thereof, or other types of transport devices.

For example, FIGS. 4A-4D show one embodiment of the product delivery system 320. In this embodiment, a picking device 330 is shown. The picking device 330 may include a pair of fingers 331. The fingers 331 may be sized so as to "pick" a product 10 therebetween. The fingers 331 then may rotate about a pivot point 332 attached to an arm 333. The fingers 331 thus may pick the product 10, pivot about the pivot point 332, and the arm 333 delivers the product 10 as desired. The fingers 331 may rotate via conventional drive motors or otherwise. The arm 333 may maneuver via a pulley system such as that shown in commonly owned U.S. Pat. No. 6,682,289 to Credle, Jr., entitled "Dispensing Apparatus and Method of using Same." U.S. Pat. No. 6,682,289 is incorporated herein by reference. Other drive methods may be used herein.

Figure 5A:
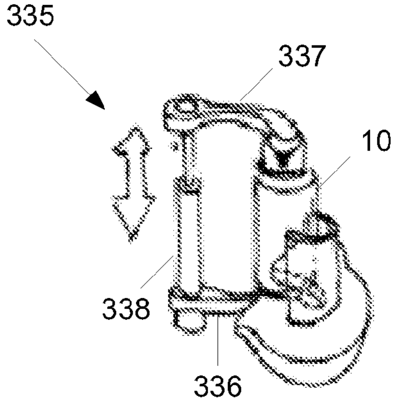
FIGS. 5A-5B are side views of a C-clamp device for use in the vending machine of FIG. 1.
Figure 5B:
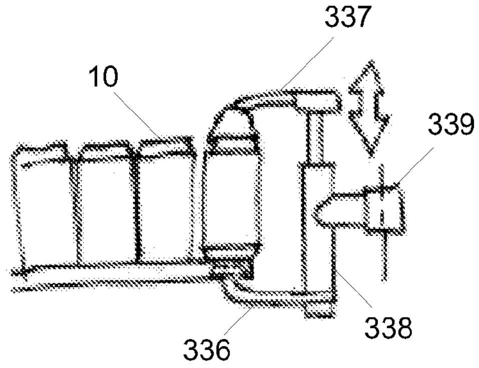

FIGS. 5A-5B show a further embodiment of the product delivery system 320, a C-clamp device 335. The C-clamp device 335 includes a fixed bottom member 336 and an extendable top member 337. The extendable top member 337 is maneuvered up and down via a piston 338 or a similar type of device. The piston 338 in turn is connected to an arm 339. In use, the fixed bottom member 336 is positioned underneath a product 10. The extendable top arm 337 is then maneuvered into position via the piston 338. Once the product 10 is in place, the arm 339 may deliver the product 10 as desired.

Figure 6A:
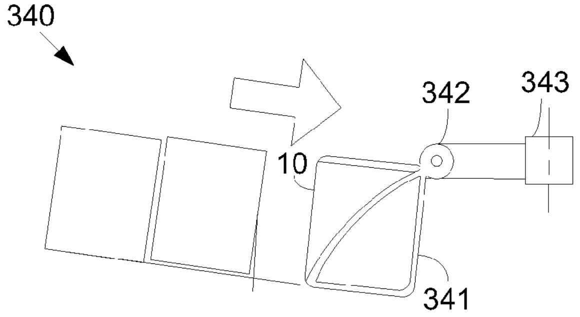
FIGS. 6A-6C are side views of a chairlift device for use in the vending machine of FIG. 1.
Figure 6B:
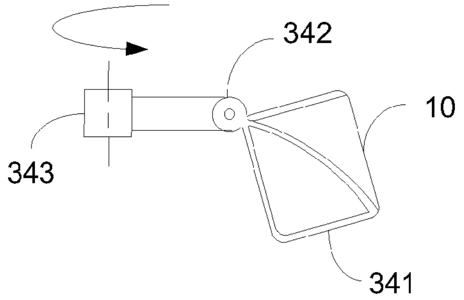
Figure 6C:
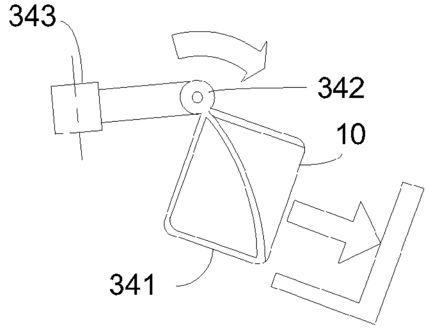
Figure 7A:
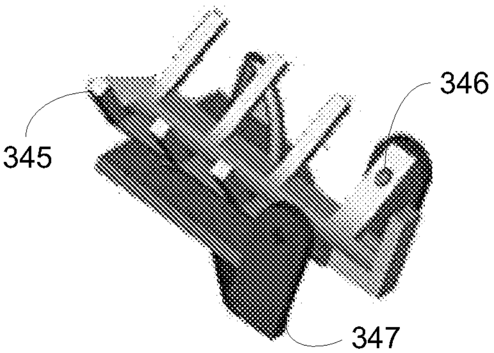
FIGS. 7A-7B are side views of an alternative chairlift device for use in the vending machine of FIG. 1.
Figure 7B:
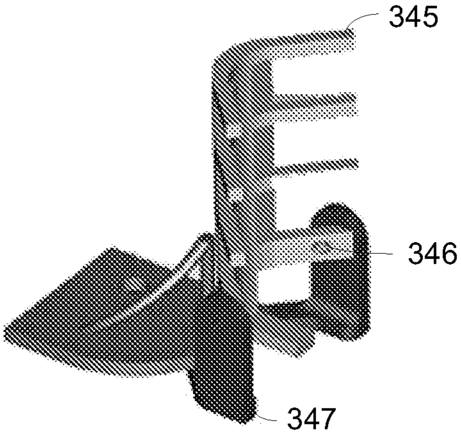

FIGS. 6A-6C show a further embodiment of the product delivery system 320, a chair lift device 340. The chair lift device 340 includes a basket 341 that may pivot about a pivot point 342. The basket 341 and the pivot point 342 are in turn connected to an arm 343. In use, the basket 341 catches the product 10. The arm 343 then maneuvers the basket 341 to the desired position where the basket 341 pivots about the pivot point 343 so as to release the product 10. A similar embodiment is shown in FIGS. 7A-7B with an alternative basket 345. The basket 345 has a lower pivot point 346 mounted to a guide rail 347. The basket 345 may pivot about the pivot point 346 via a piston or other type of device for providing reciprocating motion.

In use, new products 10 may be loaded into the vending machine 100 via the non-visible product columns 250, 260. The controller 190 monitors the number of products 10 positioned within each cell 270-300 of the visible product columns 210-240 on each product shelf 130. When the controller 190 notes that one of the cells 270-300 is empty or if a given product column 210-240 is below a certain threshold of the products 10, the product delivery system 320 will move a product or products 10 from the non-visible columns 250, 260 to the visible columns 210-240. The new products may be positioned behind the existing products 10 within each product column 210-240.

The product rotation system 200 thus ensures that FIFO rotation is maintained. Further, the products 10 may be pre-chilled in the non-visible columns 250, 260 before being positioned within the visible columns 210-240. The product rotation system 200 also maximizes storage space within the vending machine 100 as a whole. The product rotation system 200 also may provide entertainment to consumers as the restocking process takes place.

Figure 8:
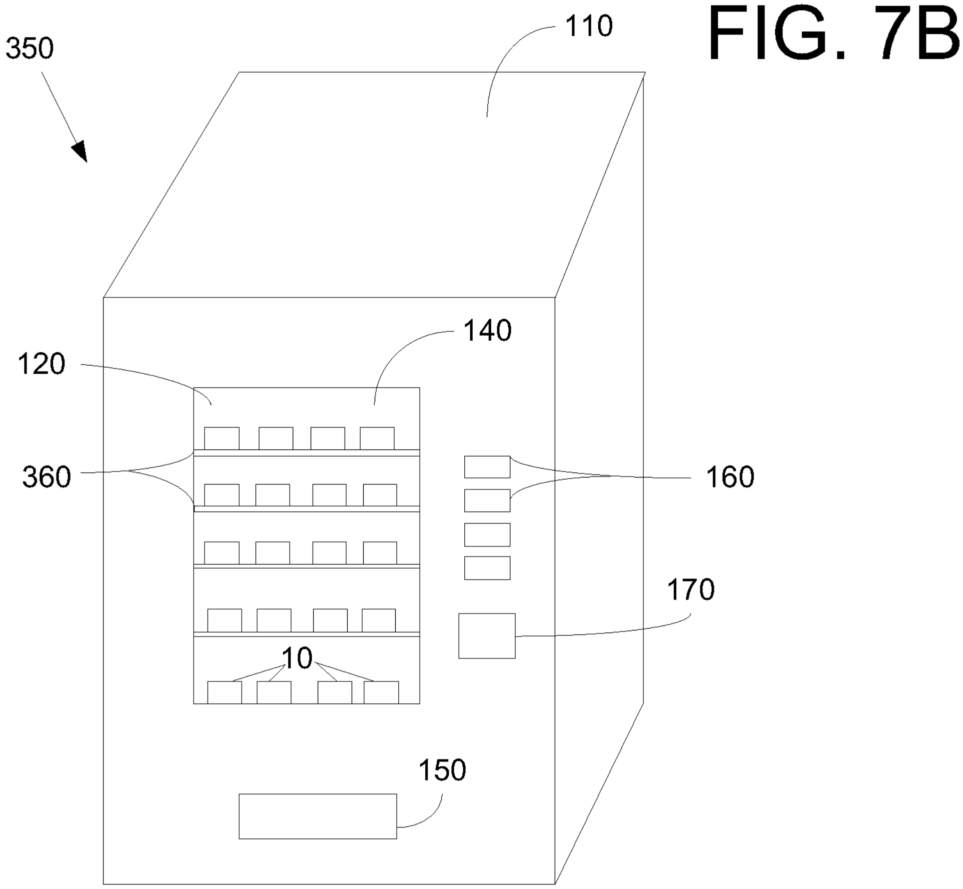
FIG. 8 is a perspective view of an alternative vending machine as is described herein.
Figure 9:
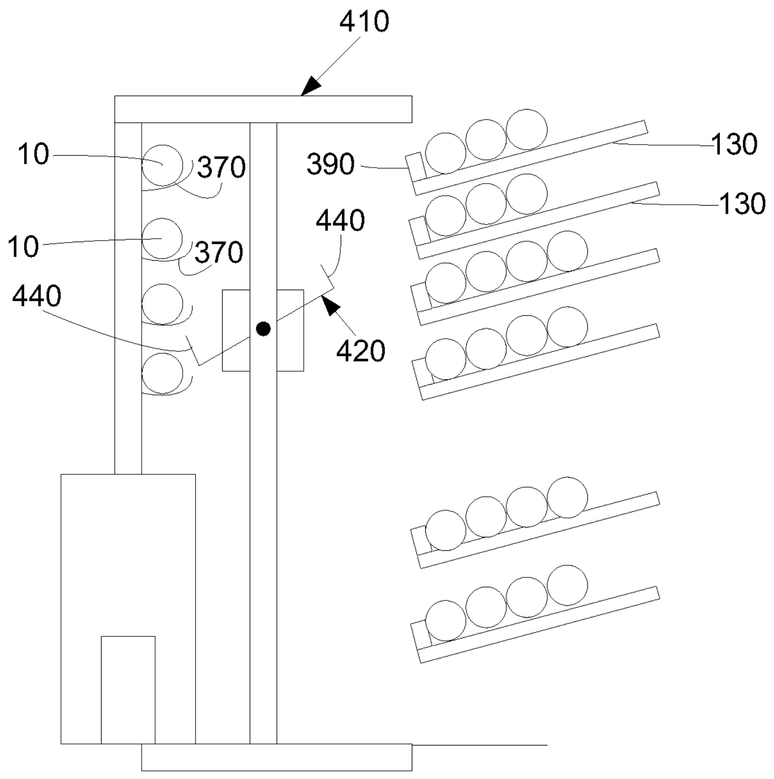
FIG. 9 is a side cross-sectional view of the vending machine of FIG. 8.
Figure 10:
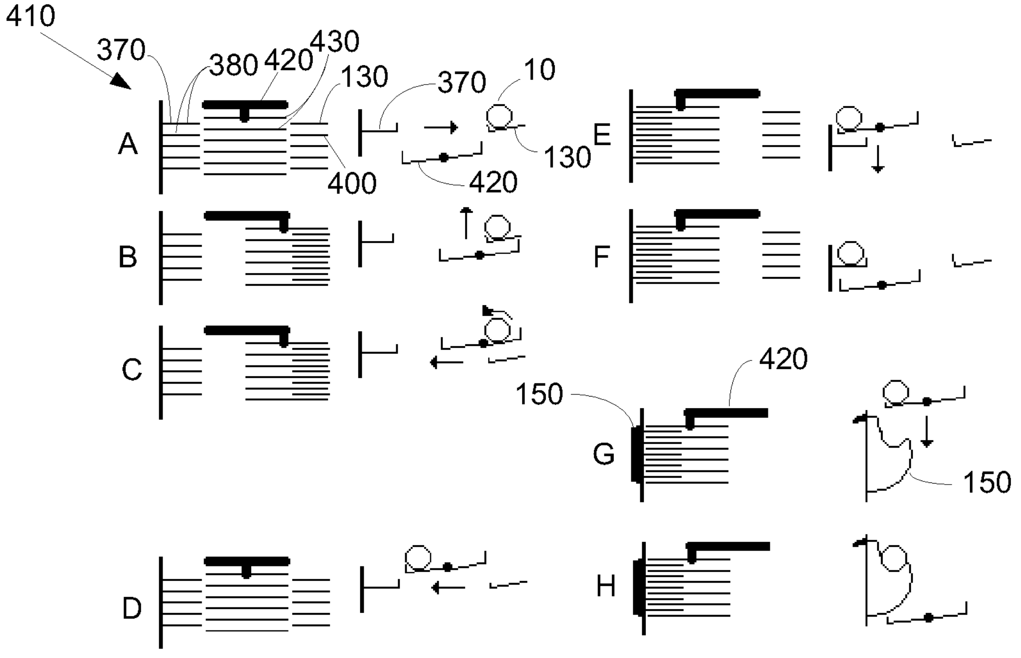
FIGS. 10A-10H are top views of the product delivery system of the vending machine of FIG. 8.

FIGS. 8-10 show a further embodiment of a vending machine 350 as is described herein. The vending machine 350 is largely similar to the vending machine 100 and its components described above. In this embodiment, however, the product shelves 130 do not come all the way to the front door 140. Rather, a number of door shelves 360 are positioned adjacent to the front door 140. The door shelves 360 may include a basket 370 positioned across from each visible column 210-240. Each basket 370 may be made out of a number of tines 380. Likewise, each product shelf 130 may include a product stop 390. The product stop 390 also may be made out of tines 400. Each product shelf 130 may have a number of non-visible columns 250, 260 and/or a number of product shelves 130 may continue beneath the front door 140 or elsewhere and hence be out of visible range.

The vending machine 350 also includes a product delivery system 410. Specifically, the product delivery system 410 may include a product tray 420. The product tray 420 includes a number of tines 430. The tines 430 are out of phase with the tines 380 of the basket 370 and the tines 400 of the product stop 390 such that they can pass therethrough. Each end of the product tray 420 also includes a flange 440 so as to maintain the products 10 therein. The product tray 420 may be capable of motion along the X, Y, and Z axes. The product tray 420 may be maneuvered along the X and Y axes via a pulley system such as that described in U.S. Pat. No. 6,182,289 referenced above. The product tray 420 also may be maneuvered along the Z axis via pneumatics or other conventional types of drive means.

The product tray 420 thus can maneuver the products 10 from the non-visible product columns 250, 260 and from the non-visible product shelves 130. The product tray 420 also can deliver the products 10 to the door shelves 360 and to the dispensing area 150 as well as to and from other locations within the interior vending space 120. The product tray 420 also can replace the products 10 if the consumer decides not to make a purchase. The products 10 are picked up and deposited via the use of the out of phase tines 430.

For example, the product tray 420 maneuvers in the Z direction in FIG. 10A towards a product stop 390 on a product shelf 130. The product tray 420 then moves in the Y direction in FIG. 10B so as to acquire the product 10. The product 10 then rolls to the front of the product tray 420 and is stopped by the flange 440 in FIG. 10C. The product tray 420 then moves back in the Z direction towards the door shelves 360 in FIG. 10D. The product tray 420 moves downward in the Y direction in FIG. 10E so as to deliver the product 10 into a basket 370 of the door shelves 360 in FIG. 10F, Alternatively, the product 10 can be delivered to the dispensing port 150 in FIGS. 10G and 10H. Other type of delivery methods may be used herein.

The products 10 thus may be maneuvered to any location within the interior vending space 120. The products 10 may he loaded within the non-visible columns 250, 260 or the non-visible product shelves 130 and then moved into the visible columns 270-300 or otherwise as desired. Specifically, sales locations on the door shelves 360 can be controlled while the products 10 may be rotated as desired. The use of the out of phase tines 430 also allows softer handling of the products 10 as compared to, for example, a gravity drop.

Figure 11A:
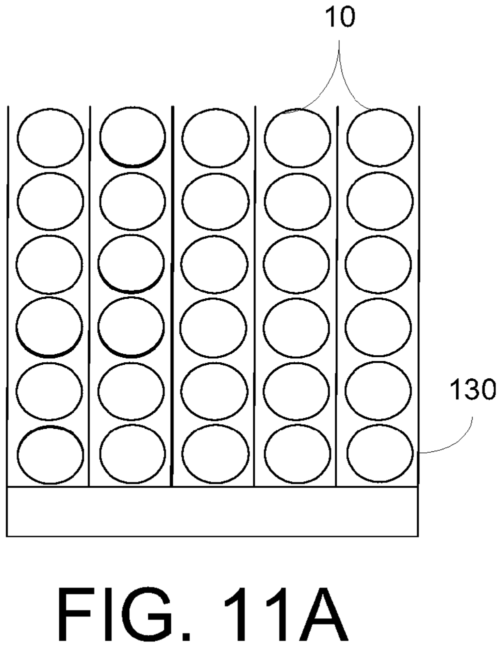
FIGS. 11A-11C are schematic views of a known product shelf loading method.
Figure 11B:
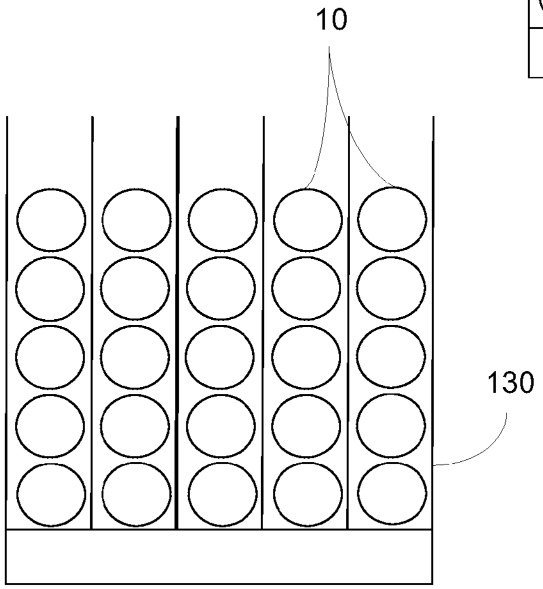
Figure 11C:
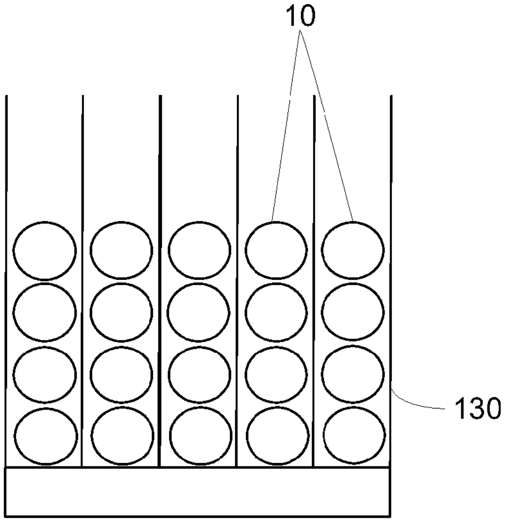
Figure 12:
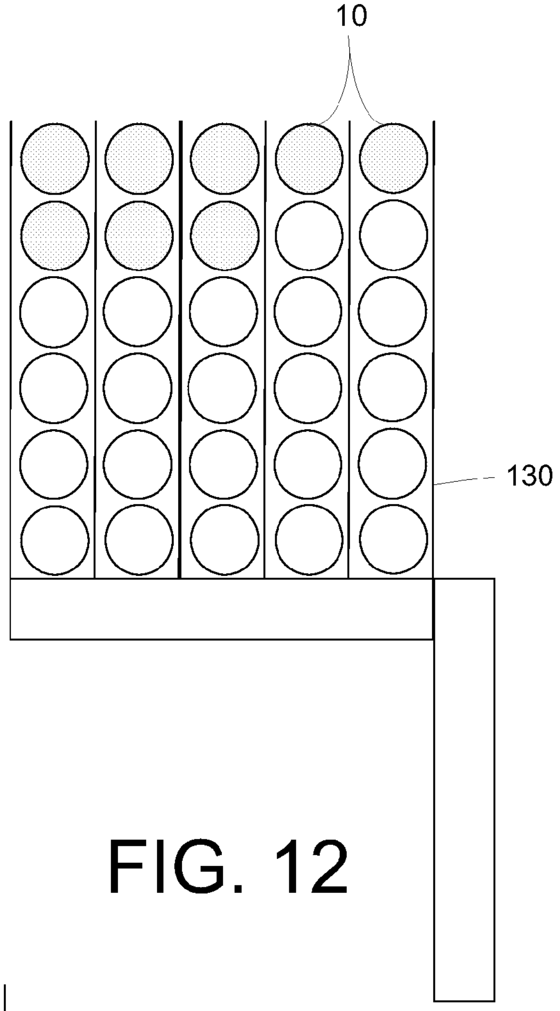
FIG. 12 is a schematic view of a known product shelf loading method.

FIGS. 11A-11D through 12 show a known sell down and restocking method as may be used with almost any type of vending machine. Traditionally, the products 10 positioned on the product shelves 130 would be sold down evenly over time as is shown in FIGS. 11A-C. As is shown in FIG. 12, however, when new products 10 are pushed in, the original cold products 10 are pushed to the back such that the consumer may get a warm product 10 after a reload. Likewise, an out of date issue may arise if the original products 10 are continually pushed to the back of the product shelf 130 without rotation.

Figure 13A:
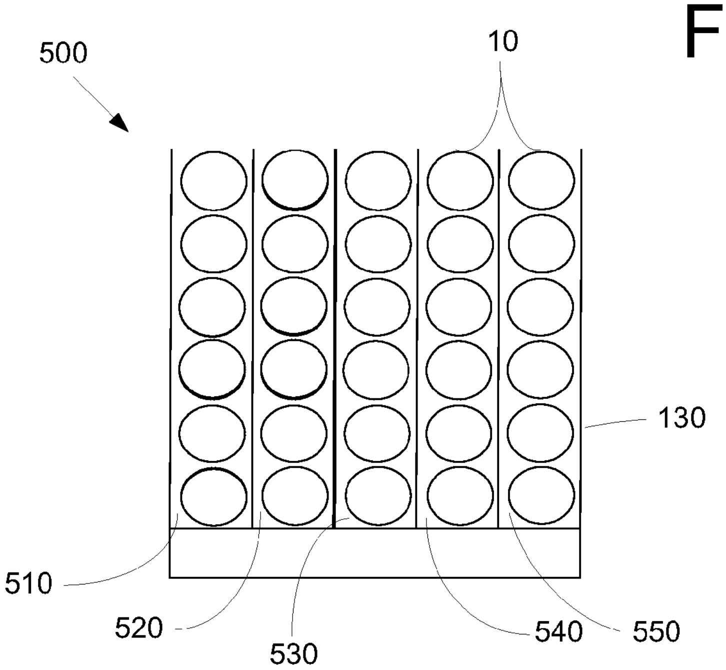
FIGS. 13A-13C are schematic views of an improved product shell loading method as is described herein.
Figure 13B:
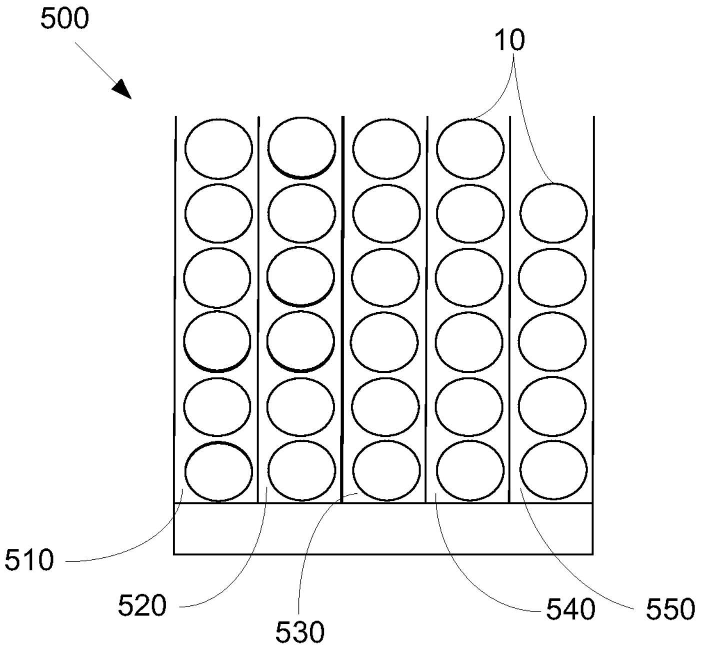
Figure 13C:
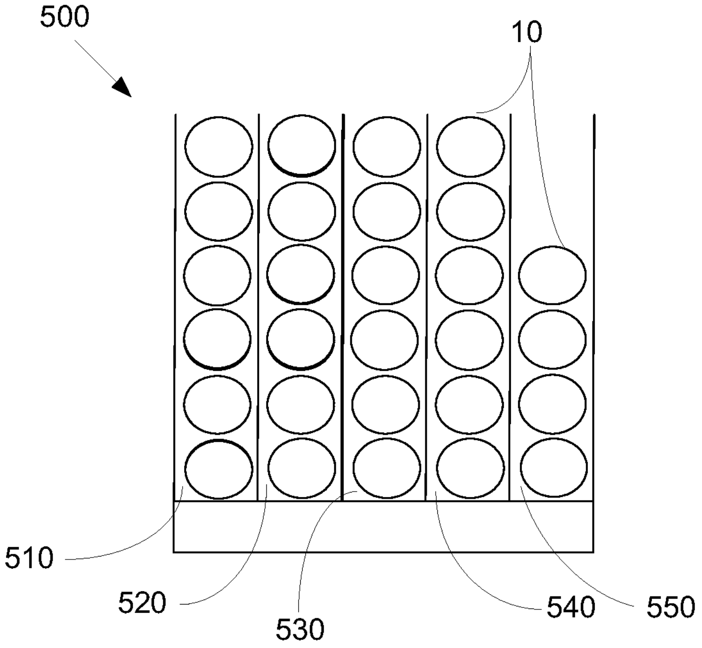
Figure 14A:
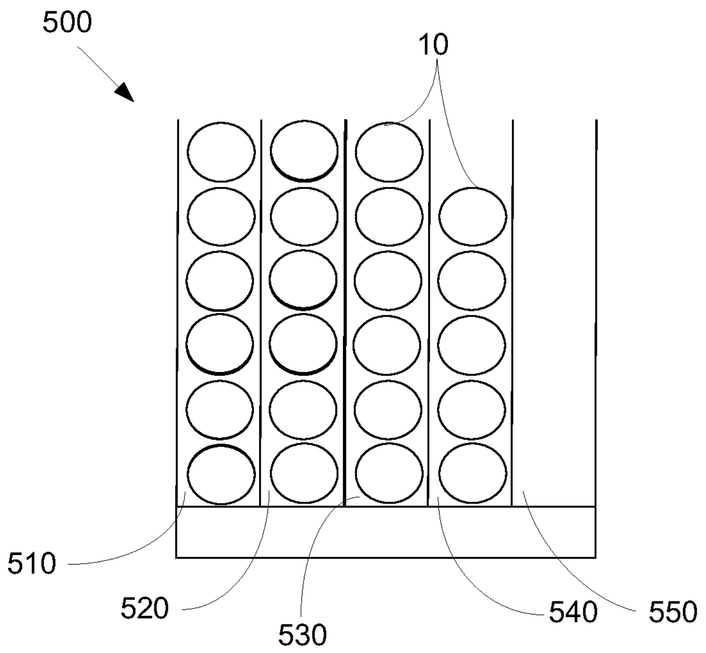
FIGS. 14A-14C are schematic views of the improved product shelf loading method.
Figure 14B:
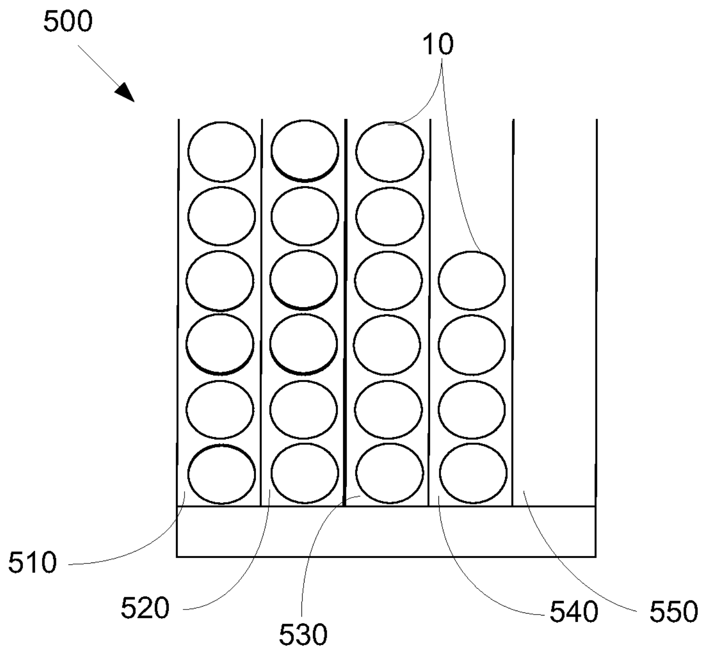
Figure 14C:
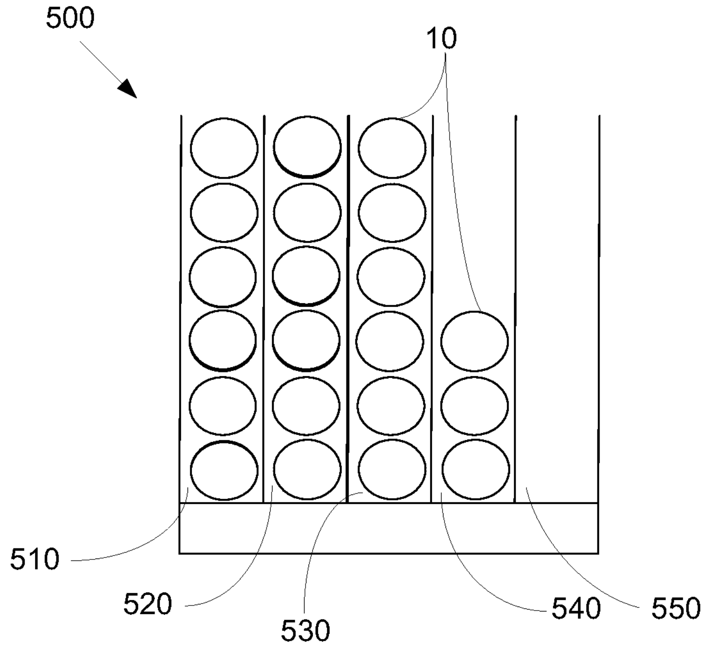
Figure 15A:
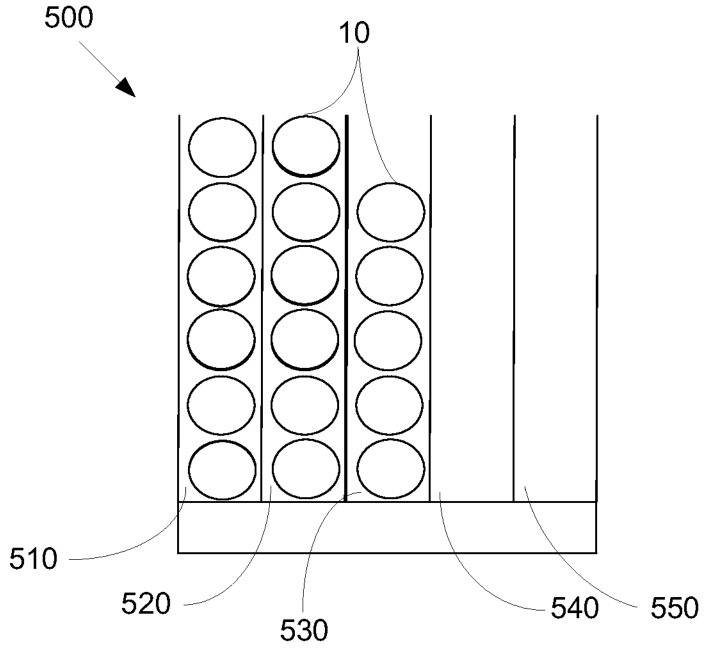
FIGS. 15A-15C are schematic views of the improved product shelf loading method.
Figure 15B:
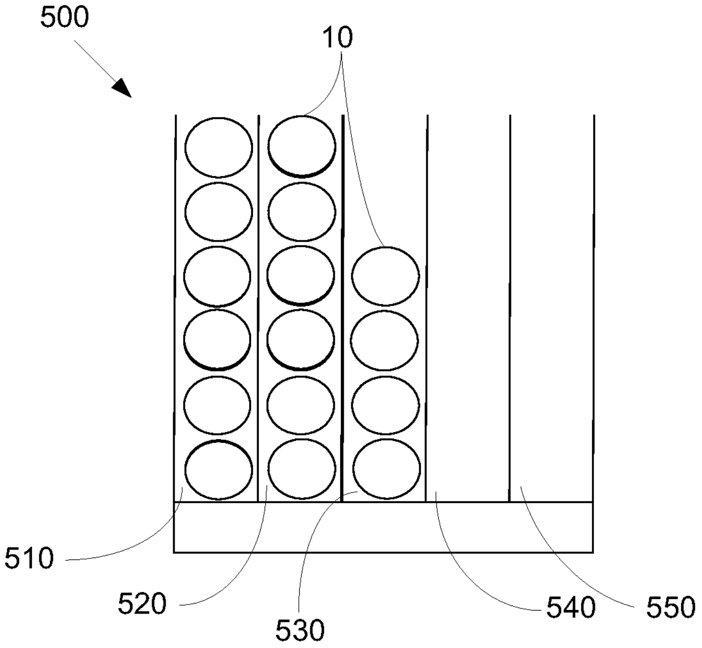
Figure 15C:
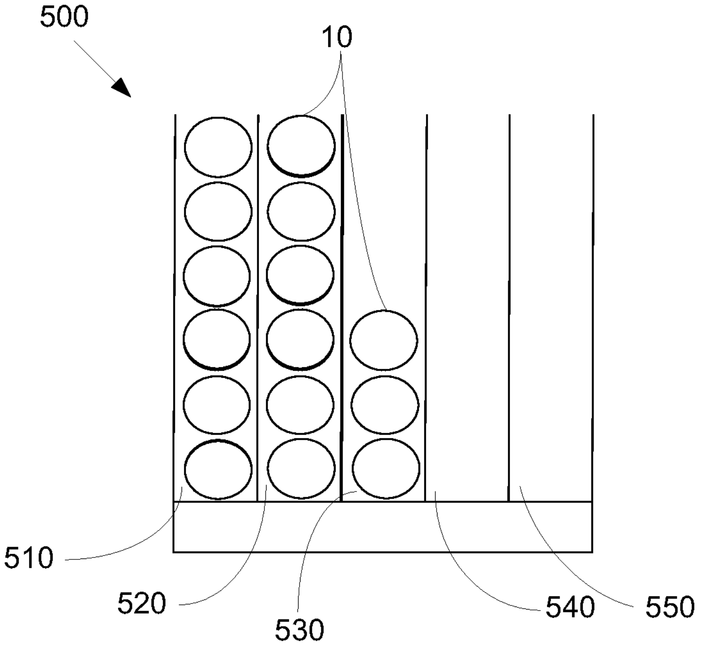
Figure 16A:
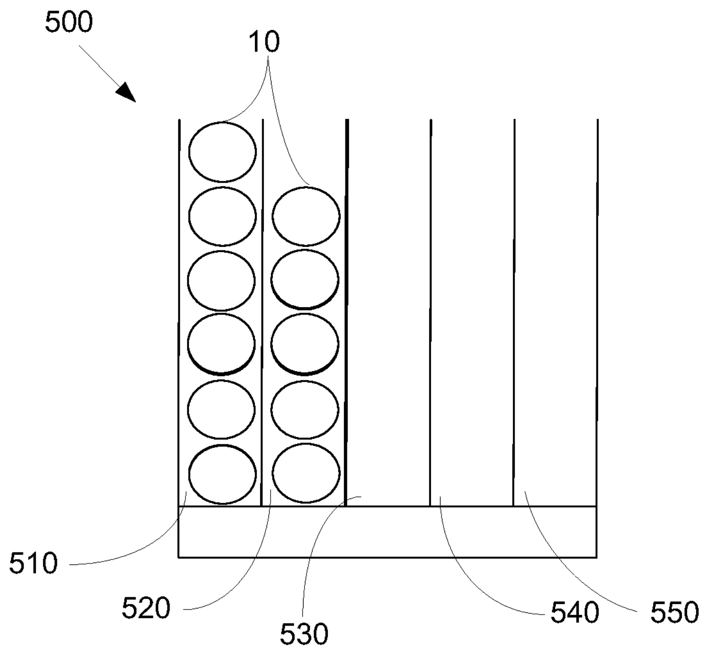
FIGS. 16A-16B are schematic views of the improved product shelf loading method.
Figure 16B:
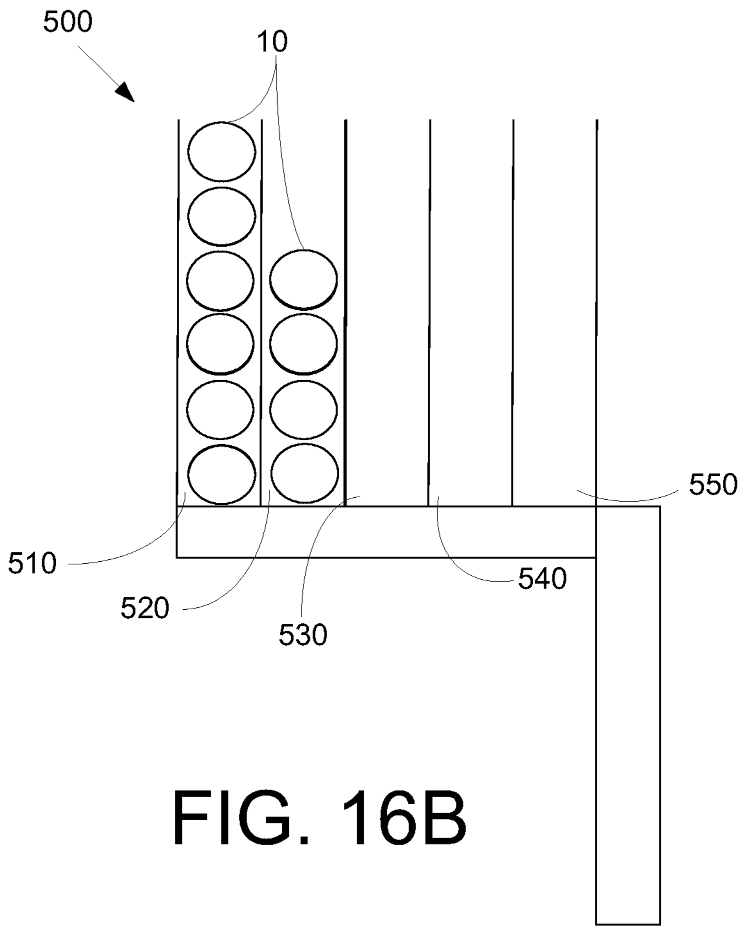
Figure 17:
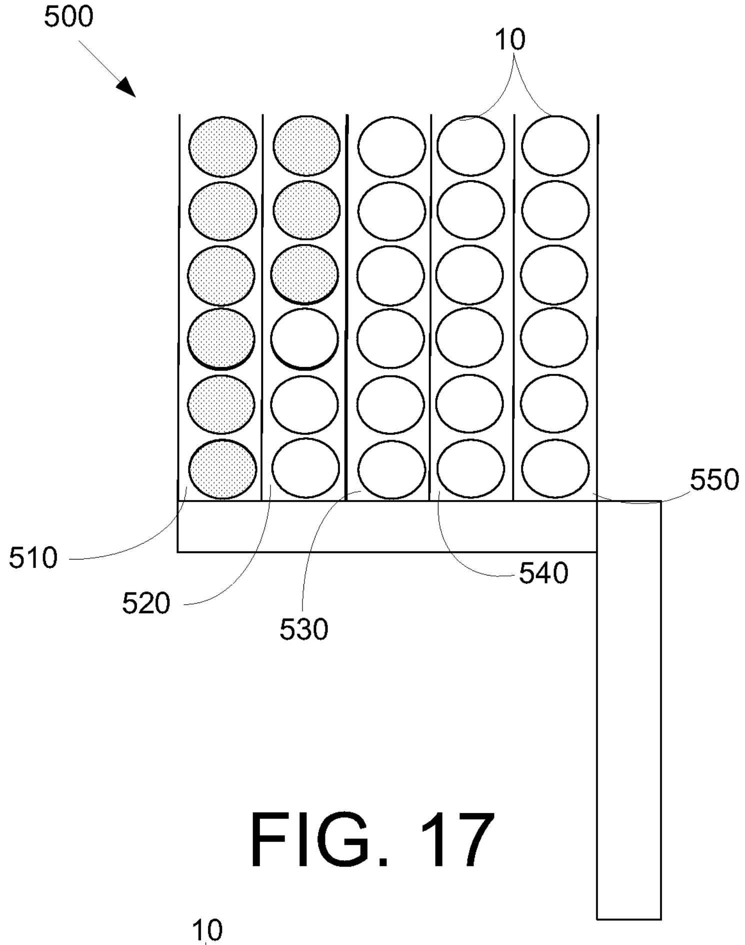
FIG. 17 is a schematic view of the improved product shelf loading method.
Figure 18A:
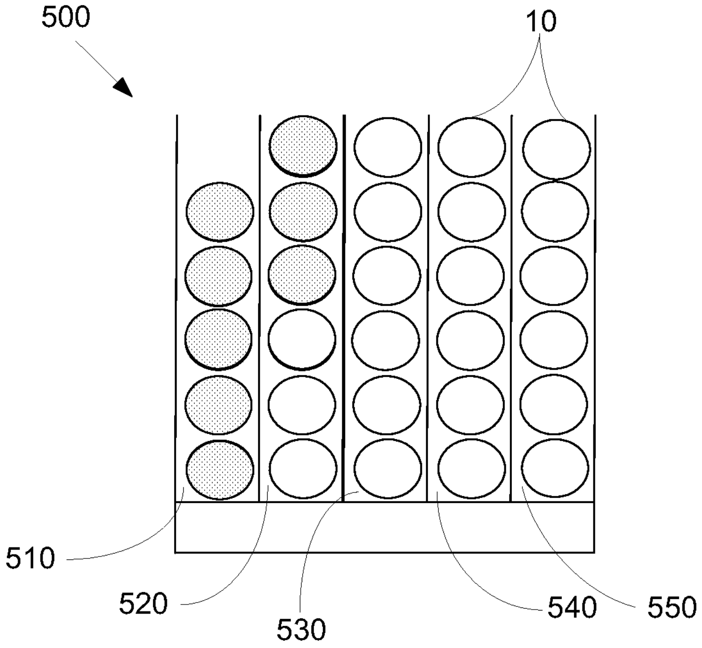
FIGS. 18A-18C are schematic views of the improved product shell loading method.
Figure 18B:
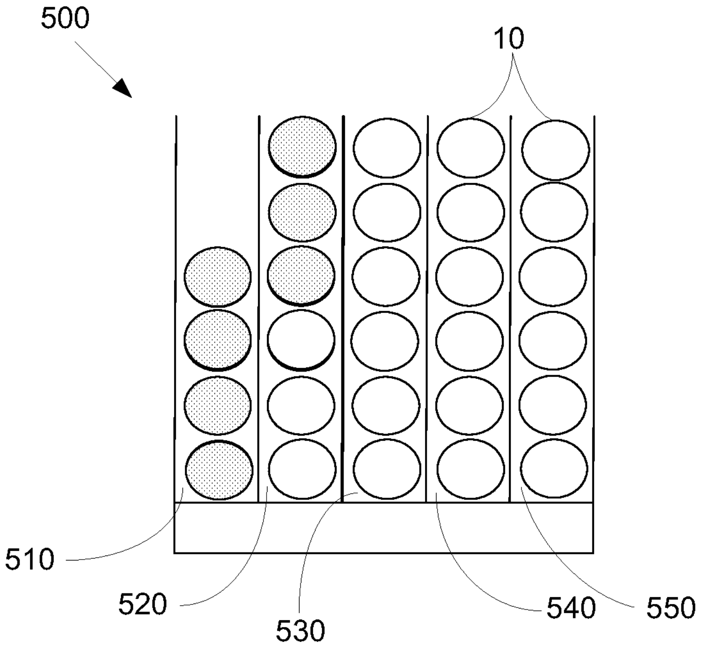
Figure 18C:
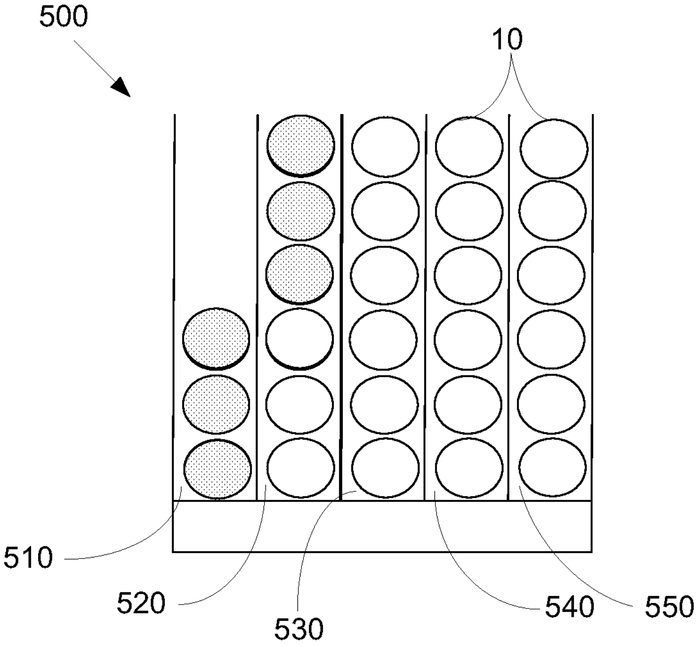
Figure 19A:
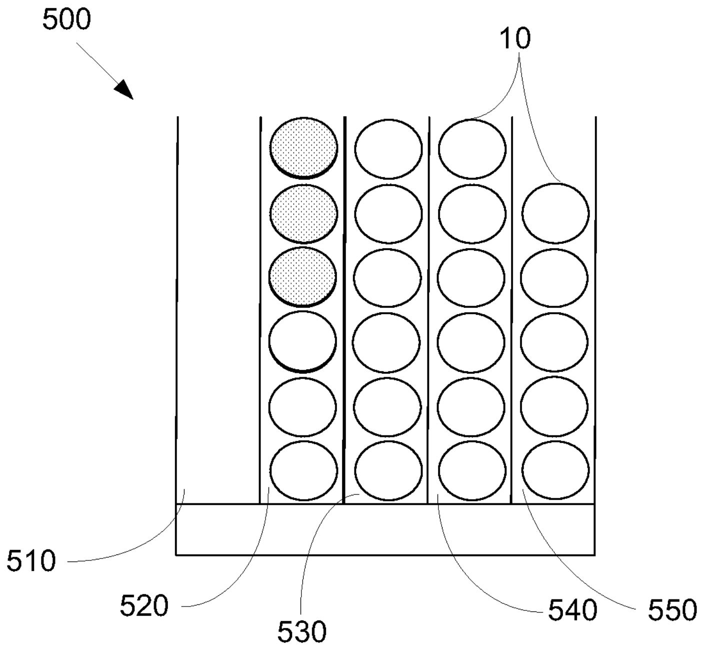
FIGS. 19A-19C are schematic views of the improved product shelf loading method.
Figure 19B:
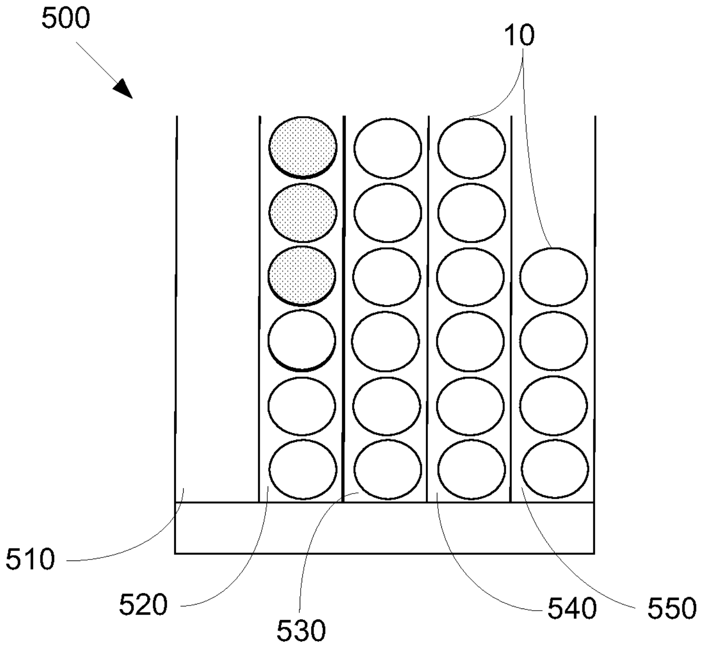
Figure 19C:
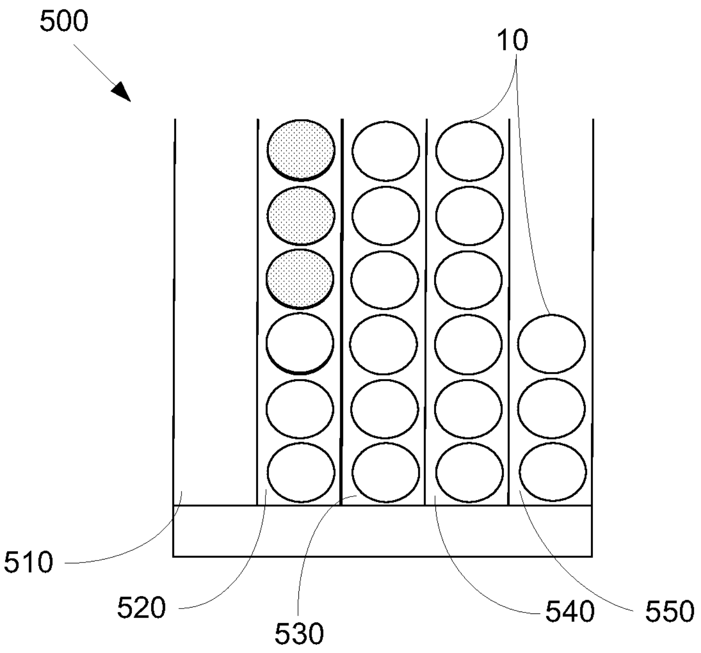
Figure 20A:
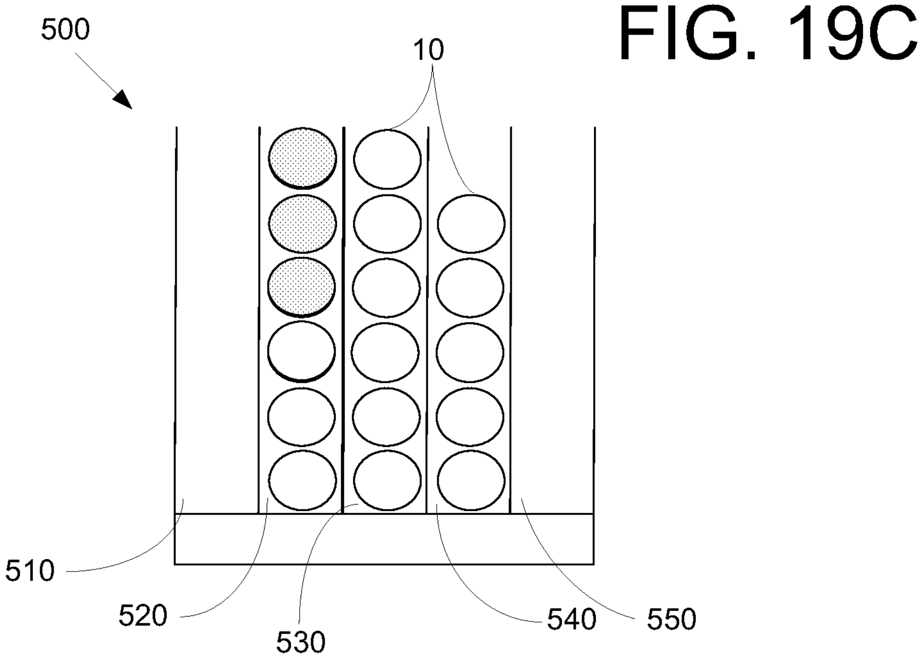
FIGS. 20A-20C are schematic views of the improved product shelf loading method.
Figure 20B:
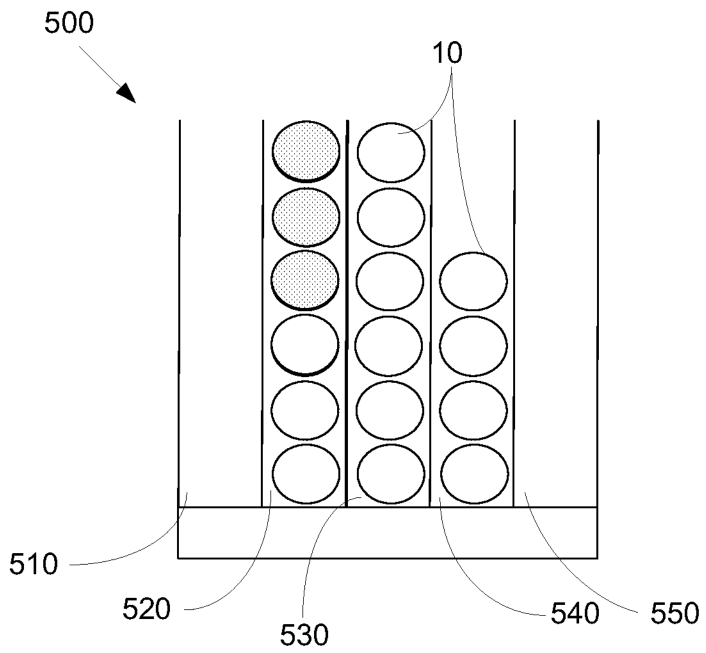
Figure 20C:
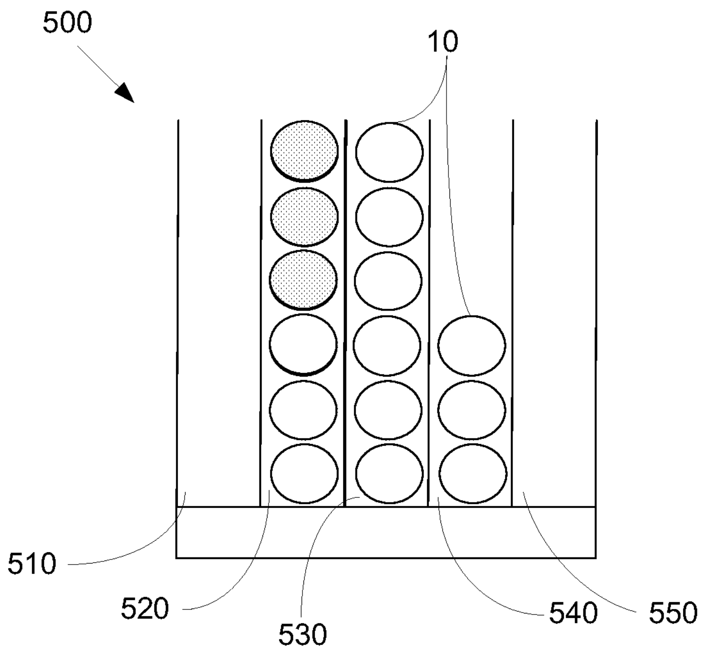
Figure 21A:
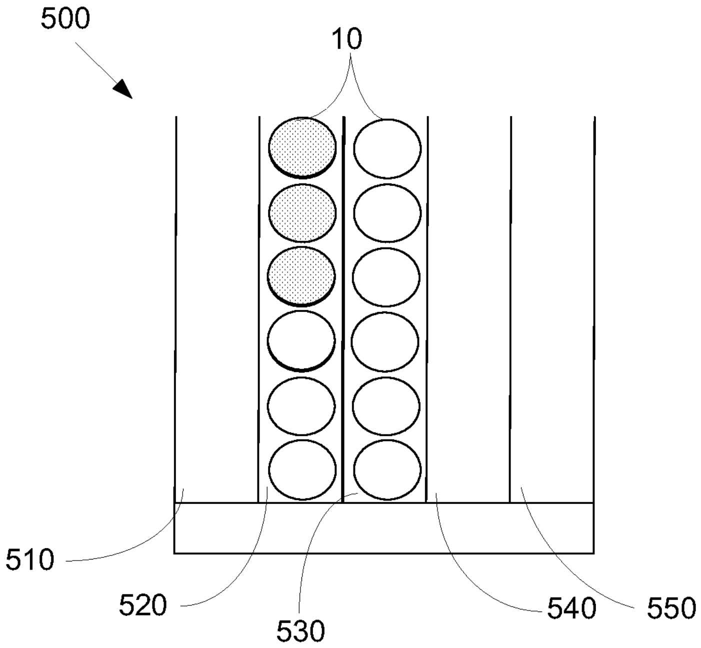
FIGS. 21A-21C are schematic views of the improved product shelf loading method.
Figure 21B:
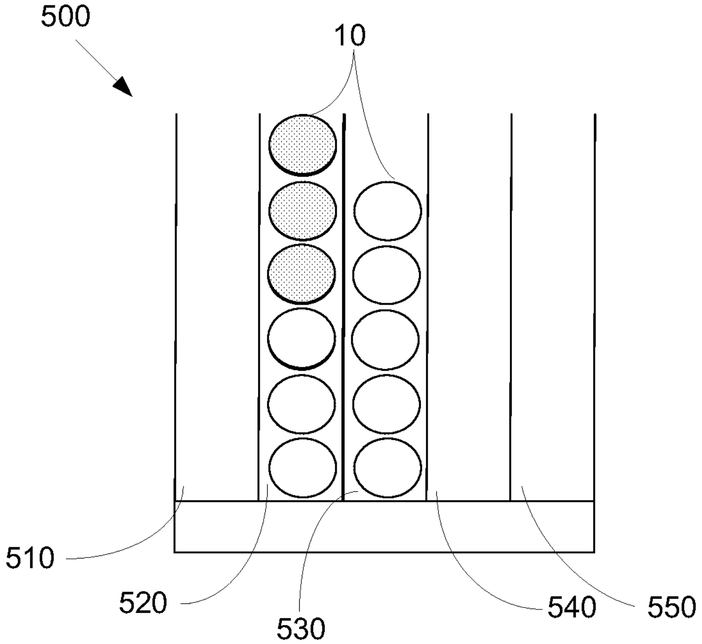
Figure 21C:
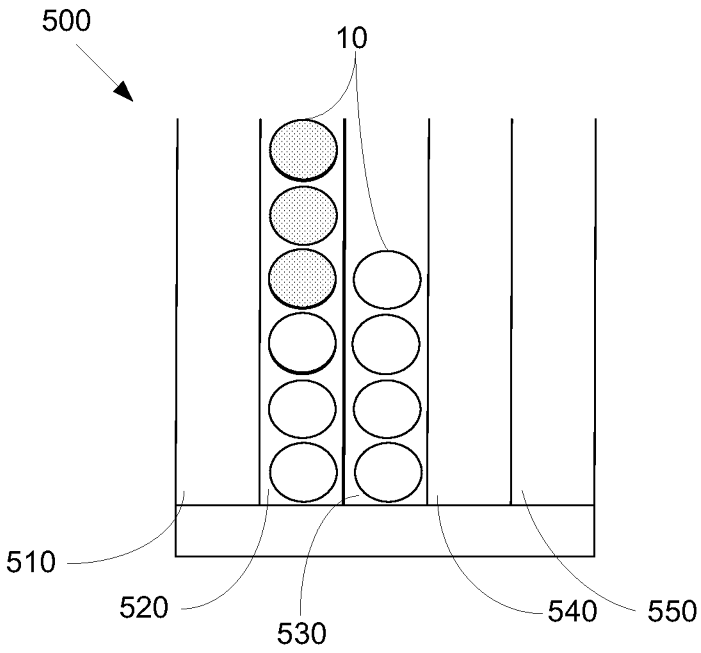
Figure 22:
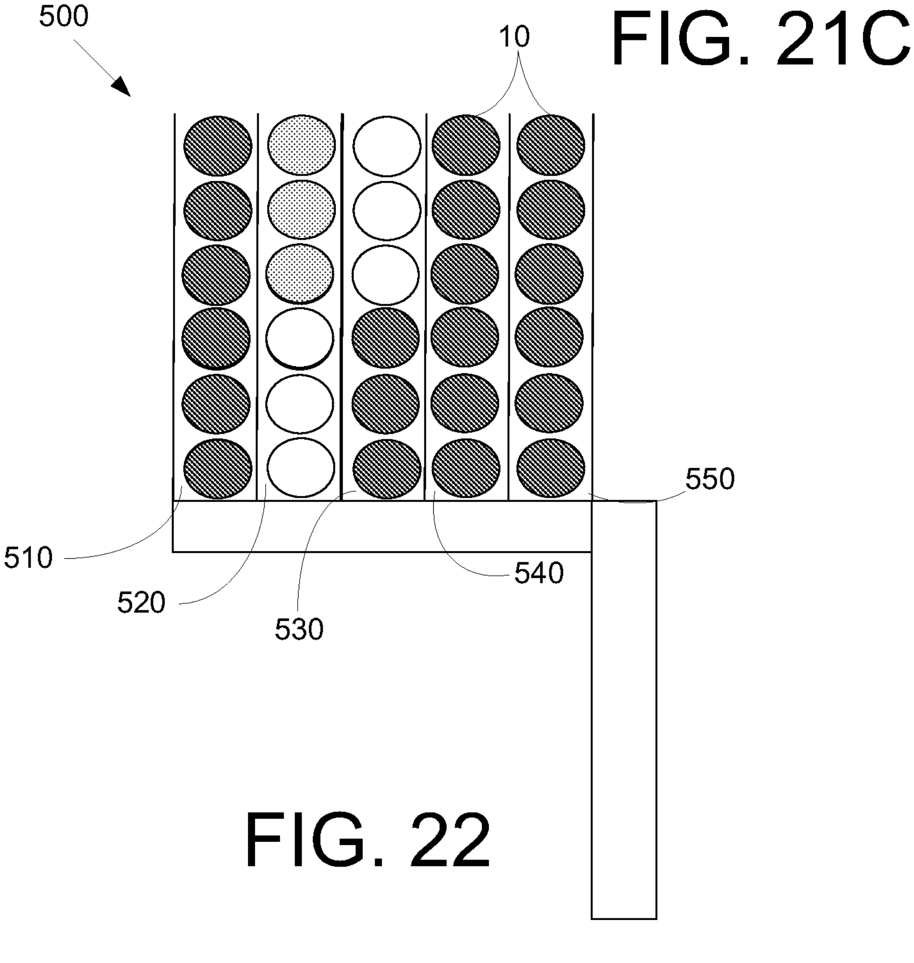
FIG. 22 is a schematic view of the improved product shelf loading method.
Figure 23A:
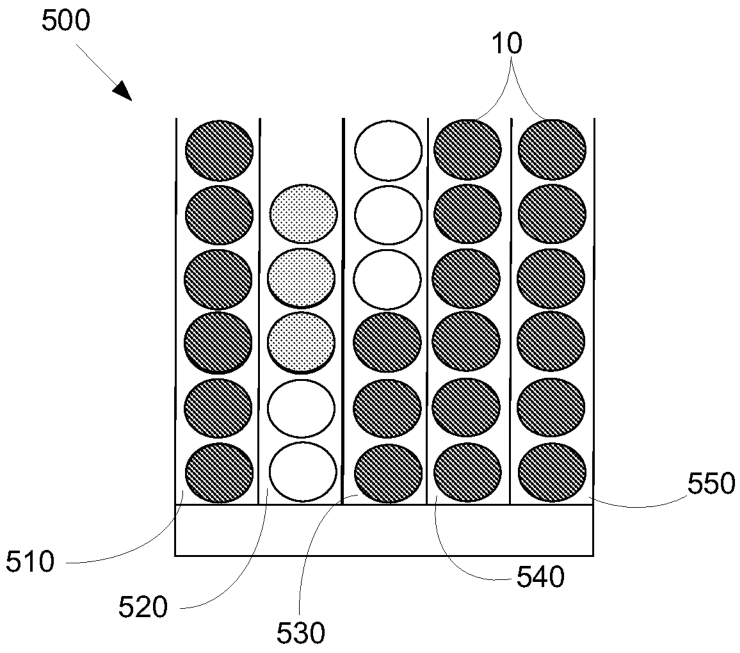
FIGS. 23A-23E are schematic views of the improved product shelf loading method.
Figure 23B:
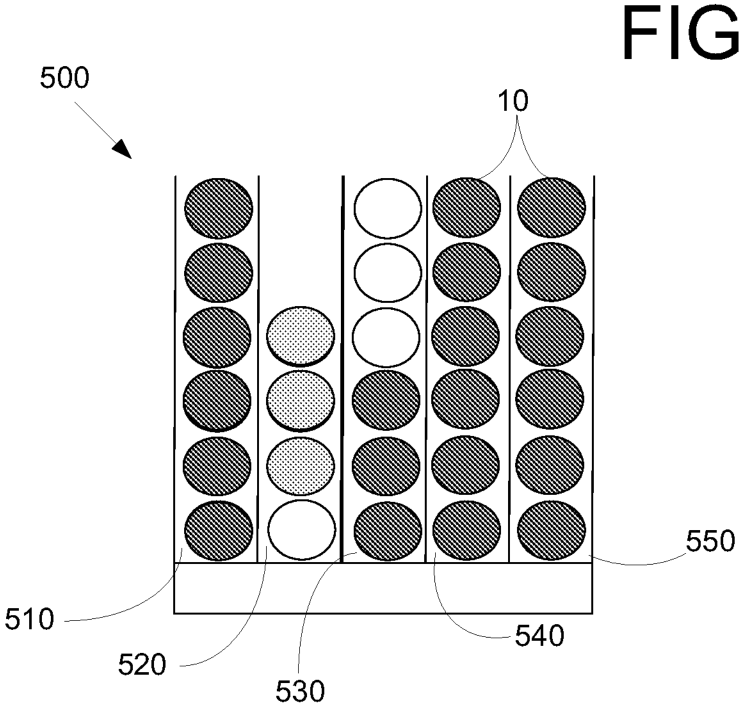
Figure 23C:
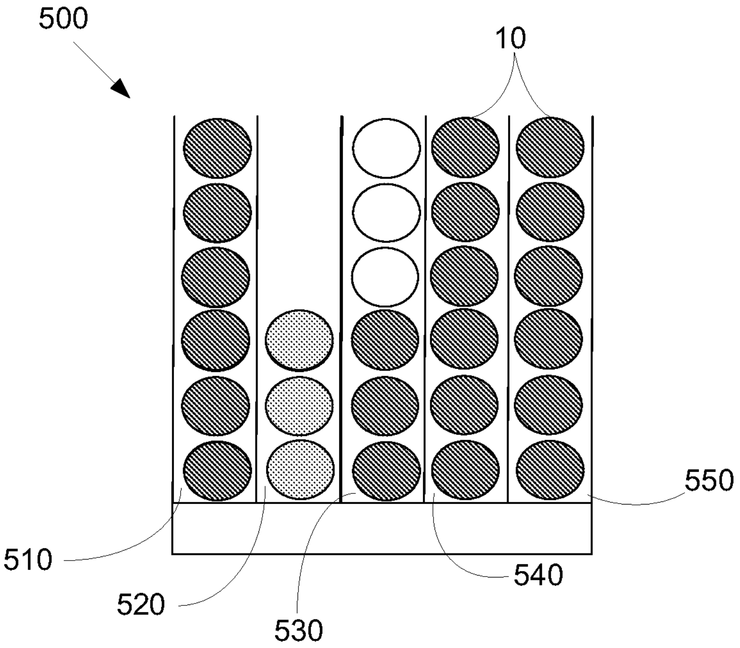
Figure 23D:
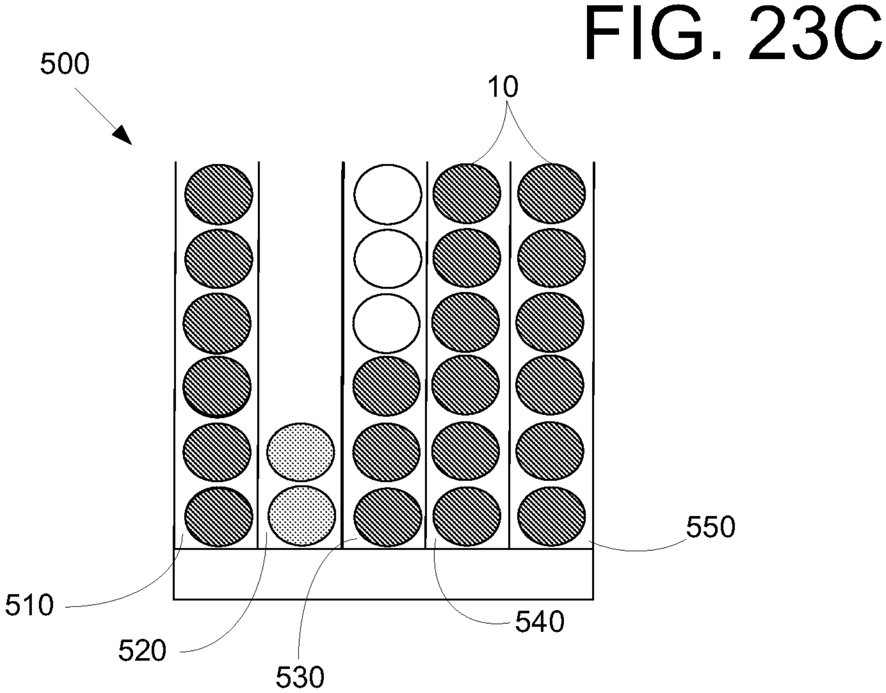
Figure 23E:
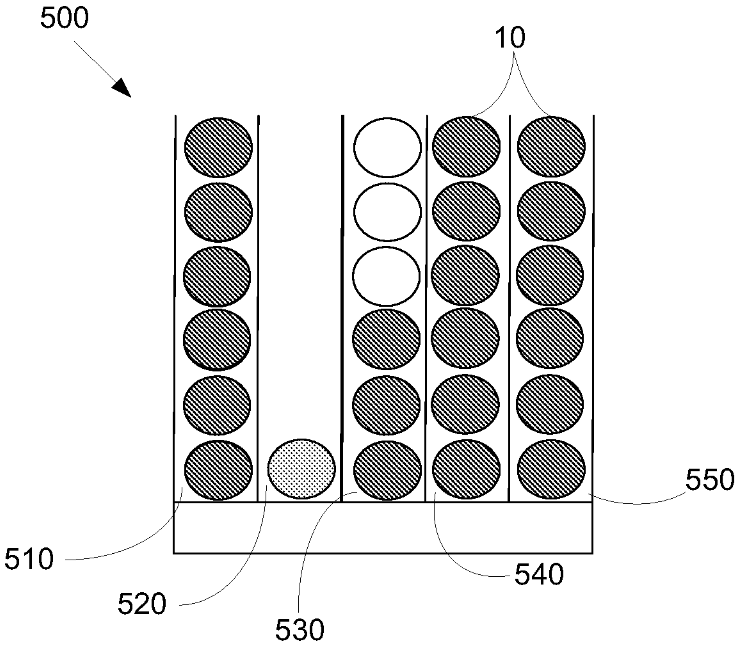

In the improved sell down method, however, each column is sold down separately. For example, FIGS. 13A-13C show a product shelf 500 with columns 510, 520, 530, 540, and 550. As is shown, the products 10 in column 550 are dispensed first. Once column 550 is empty, column 540 is dispensed as is shown in FIGS. 14A-14C. Likewise, columns 530 and 520 are dispensed as is shown in FIGS. 15A-15C and in 16A-16B. If the shelf 500 is then reloaded from the front, the remaining products 10 in column 520 are pushed to the back and columns 530-550 are filled as is shown in FIG. 17. At that point, the next full column is dispensed. In this case, the first column 510 as is shown in FIGS. 18A-18C is dispensed. This method thus allows the new products 10 to be chilled. Once the products 10 in column 510 are dispensed, the new products in column 550 are dispensed as is shown in FIGS. 19A-19C. Likewise, the products in column 540, 530 are then dispensed as is shown in FIGS. 20A-20C and 21A-21C. If the shelf 500 is then reloaded when column 530 is half full, the remaining products in column 530 are pushed back and columns 510, 540, 550 are filled as is shown in FIG. 22. The next filled column is then dispensed as is shown in FIGS. 23A-23E. In this case, column 520 is dispensed, including the last remaining products 10 from the original load. The process is then repeated.

The methods described herein thus provide for continuous rotation of the products 10 therein so as to minimize out-of-date products. Likewise, consumers are guaranteed a cold product 10 after a reload. These vending methods may be programmed into the controller 190 via conventional methods. Similar methods may be used herein.

It should be apparent that the foregoing relates only to the preferred embodiments of the present application and that numerous changes and modifications may be made herein by one of ordinary skill in that art without departing from the general spirit and scope of the invention as defined by the following claims and the equivalents thereof.

We claim:

1. A method of dispensing a number of products comprising original products and new products from a vending machine shelf with a number of product columns, the method comprising:

selling down, by a product delivery system, a first column of the number of product columns;

selling down, by the product delivery system, a number of adjacent columns one by one while leaving one or more product columns stocked in full with the original products;

restocking the sold down columns by pushing in the new products from a front of each of the product columns to create one or more product columns stocked in full with the new products and a product column stocked in full with a mix of the original products and the new products;

selling down, by the product delivery system and initially after restocking, the one or more product columns stocked in full with the, original products; and selling down, by the product delivery system, the one or more product columns stocked in full with the new products prior to selling down the product column stocked in full with the mix of the original products and the new products.

2. The method of claim 1, further comprising the step of selling down, by the product delivery system, one or more remaining columns one by one until the one or more remaining columns are depleted.

3. A method of dispensing products from a vending machine shelf, comprising:

stocking a plurality of first products in a plurality of product columns;

selling down, by a product delivery system, the plurality of first products in each of the plurality of product columns one by one;

restocking each of the sold down product columns with a plurality of new products so that the plurality of product columns comprise one or more product columns stocked in full with the first products, one or more product columns stocked in full with the new products, and a product column stocked in full with a mix of the first products and the new products;

selling down, by the product delivery system and initially after restocking, the one or more product columns stocked in full with the first products; and selling down, by the product delivery system, the one or more product columns stocked in full with the new products prior to selling down the product column stocked in full with the mix of the first products and the new products.

4. The method of claim 3, further comprising pushing in the plurality of new products from a front of the product columns when restocking the product columns.

* * * * *